Dec. 23, 1924.

E. P. WATSON, SR 1,520,622

EGG CARRIER

Filed April 5, 1924

WITNESSES
H. J. Walker
A. L. Kitchin

INVENTOR
EDMOND P. WATSON SR.
BY Munn & Co
ATTORNEYS

Dec. 23, 1924.

E. P. WATSON, SR 1,520,622

EGG CARRIER

Filed April 5, 1924   2 Sheets-Sheet 2

WITNESSES
H. J. Walker
A. L. Kitchin

INVENTOR
Edmond P. Watson Sr.
BY
ATTORNEYS

Patented Dec. 23, 1924.

1,520,622

UNITED STATES PATENT OFFICE.

EDMOND P. WATSON, SR., OF BENTONVILLE, ARKANSAS.

EGG CARRIER.

Application filed April 5, 1924. Serial No. 704,472.

*To all whom it may concern:*

Be it known that I, EDMOND P. WATSON, Sr., a citizen of the United States, and a resident of Bentonville, in the county of Benton and State of Arkansas, have invented a new and Improved Egg Carrier, of which the following is a full, clear, and exact description.

This invention relates to egg carrying devices and particularly to an improvement over the egg case shown in my prior Patent No. 1,450,124, issued March 27, 1923.

The object of the invention is to provide a convenient egg carrying device wherein auxiliary members or slides are provided whereby groups of cartons may be inserted and removed independent of other groups.

Another object of the invention is to provide an improved arrangement of resilient hook or support for the various cartons.

In the accompanying drawings—

Figure 1:
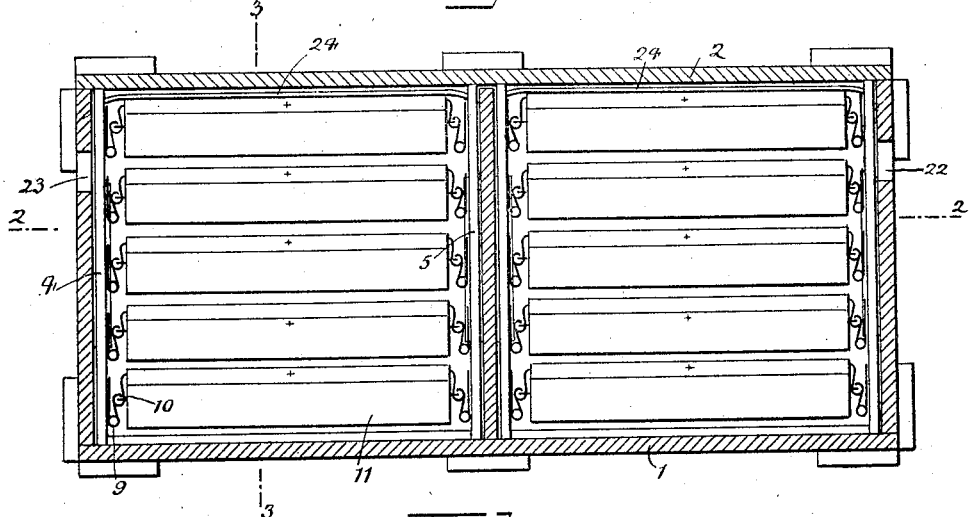
Figure 1 is a longitudinal vertical sectional view through an egg carrier or case embodying the invention, said section being taken approximately on line 1—1 of Figure 2.

Referring to the accompanying drawings by numerals, 1 indicates a casing or container of any approved type provided with a lid or cover 2 held in position in any desired manner. This casing and lid may be of the kind illustrated in my prior patent or may be any other form of casing of the correct size to receive the various slides or frames 3. These frames are each provided with sliding plates 4 and 5 connected preferably by a single connecting member 6 which may be metal, wood or any desired material but of a width to pass between the respective guiding channels 7 and 8 whereby the frames may be bodily inserted and removed. Each of the slides 4 and 5 is provided with a number of spring hooks 9 hereinafter described in detail, said spring hooks co-acting with the eyelets 10 carried by the various cartons 11.

Figure 2:
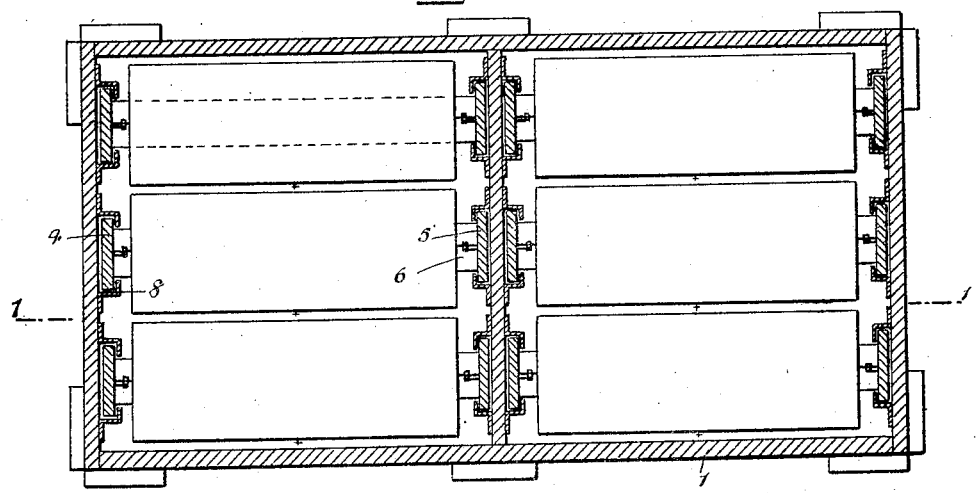
Figure 2 is a horizontal sectional view through Figure 1, approximately on line 2—2.
Figure 3:
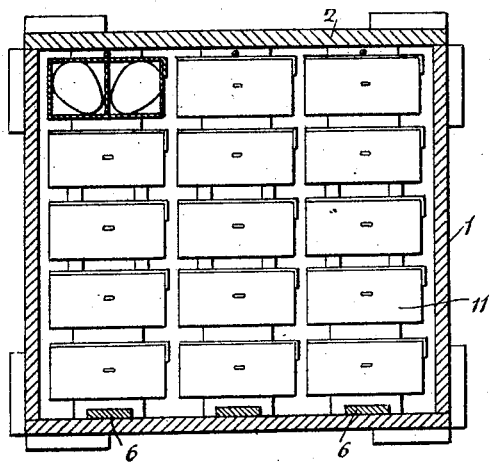
Figure 3 is a transverse sectional view through Figure 1, approximately on line 3—3.
Figure 4:
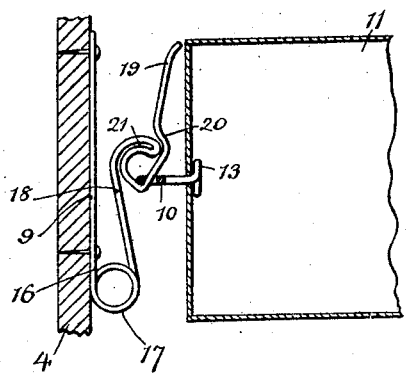
Figure 4 is an enlarged detail fragmentary sectional view showing a combined hook and spring in elevation, the same disclosing certain features of the invention.

As shown in Figure 1, there is provided five hooks 9 and a corresponding number of cartons 11, each carton being provided with an eyelet 10 at each end to engage the respective hooks 9. When the device is in use, the eggs are placed in the cartons 11 and then the various cartons are mounted on the various hooks 9 until the entire frame is full. The frame and cartons are then bodily inserted by a downward sliding movement whereby they will eventually assume the position shown in the drawing. This action is repeated until all of the frames are in the position shown in Figure 2 and then the lid 2 is closed and secured in any desired manner. It will be noted that the slides 4 and 5 extend upwardly to a point where they are engaged by the lid 2 so that the frames are firmly held in place and, consequently, the only movement provided is through the action of the spring hook 9. This spring hook as more particularly shown in Figure 4, is of a special construction and co-acts with the eyelet 10 of the respective cartons 11. The eyelet 10 is provided with an elongated aperture 12 and with a bent end 13 interlocking with the carton 11. The elongated aperture 12 accommodates the slanting section 14 of hook 9, which section is of appreciable width so that the eyelet cannot rock and, consequently, the carton cannot rotate. It is, of course, understood that the carton may be of any desired construction provided it is supplied with eyelets 10. The hook 9 may be of any desired size but it has been found that a hook structure approximately two inches long, produces satisfactory results.

In forming the hook structure as shown in Figure 4, a flat strip of spring metal is used, the strip being preferably approximately one-half inch wide at the point 15 merging into a quarter of an inch wide at about point 16. The loop section 17 is preferably a quarter of an inch wide and this quarter of an inch extends up approximately to point 18 where it gradually widens to about one-half an inch, which width naturally assists in preventing the eyelet 10 and carton 11 from rotating. These dimensions have been found satisfactory in use but it will be understood that other dimensions may be used without departing from the spirit of the invention, as the idea is to provide an effective resilient hook which will support the carton, prevent the same from rotating and also prevent the same from leaving the hook unless positively forced therefrom.

It will be noted that the upper end 19 of the hook merges into an arc-shaped section 20 following the curved portion 21 and preferably contacting with the end of said curved portion whereby there is a structure acting as an eyelet for receiving the eyelet 10. By using some pressure, the eyelet 10 may be readily forced from the position shown in Figure 1 to a disengaged position or may be forced to that position. It will be noted that there is a hook at each end of each carton for supporting the same independently on the slides of the frame and that each frame is independently mounted in the sliding guides 7 and 8. The hook 9 may be secured to the respective slides 4 and 5 by any suitable means, as for instance, the nails 22.

When the device is in use and the lid or cover 2 is in position as shown in Figure 1, the empty case may be readily carried by the workmen inserting their hands in the repective openings 22 and 23. When it is desired to remove the eggs, the operator may readily grasp the rod 24 connected to the upper end of each of the frames and lift the entire frame from the casing. By the provision of the rod 24, a handle is provided for each frame so that it may be handled as a unit in applying or removing or in transporting a short distance away from the casing.

What I claim is:

1. In an egg carrier of the character described, a plurality of cartons arranged in said carrier and a plurality of springs for supporting each carton, each of said springs being formed with a section for receiving fastening means whereby it may be fastened to a support, a coiled section for affording greater resiliency, and a bent or hook portion connected with the cartons.

2. In an egg carrier of the character described, a casing, a plurality of cartons arranged in the casing, an eyelet extending from each of said cartons, each of said eyelets having flattened openings, and a hook co-acting with each of said eyelets for supporting the eyelets and the cartons to which they are secured, each of said hooks being formed with a flattened hook portion conforming to the shape of the opening in the eyelets whereby the eyelets and the cartons carried thereby cannot independently rotate.

3. In an egg case, a box, a plurality of independent frames removably mounted in said box, and a plurality of cartons resiliently and removably supported on each of said frames.

4. In an egg case, a box, a plurality of independent frames removably and slidably mounted in said box, means presenting slideways for each of said frames whereby the frames may be bodily slid into and out of said box, and a plurality of cartons resiliently supported on each frame.

5. In an egg case, a box, a plurality of frames slidably mounted in said box so as to be slid into and out of the box, each of said frames being provided with a vertically arranged sliding plate, a plurality of resilient hooks carried by each of said plates, and a carton for each pair of hooks, each of said cartons having an eyelet at each end adapted to interlock with the hooks whereby the cartons are supported thereby.

EDMOND P. WATSON, Sr.